US012331762B2

(12) United States Patent
Nose et al.

(10) Patent No.: US 12,331,762 B2
(45) Date of Patent: Jun. 17, 2025

(54) HYDRAULIC DRIVE SYSTEM

(71) Applicant: KAWASAKI JUKOGYO KABUSHIKI KAISHA, Kobe (JP)

(72) Inventors: Tomomichi Nose, Kobe (JP); Hayato Kawasaki, Kobe (JP); Hideyasu Muraoka, Kobe (JP); Nobuyuki Kinoshita, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 0 days.

(21) Appl. No.: 18/005,111

(22) PCT Filed: Jun. 29, 2021

(86) PCT No.: PCT/JP2021/024489

§ 371 (c)(1),
(2) Date: Jan. 11, 2023

(87) PCT Pub. No.: WO2022/014315

PCT Pub. Date: Jan. 20, 2022

(65) Prior Publication Data

US 2023/0265865 A1 Aug. 24, 2023

(30) Foreign Application Priority Data

Jul. 14, 2020 (JP) ................................. 2020-120627

(51) Int. Cl.
*F15B 11/044* (2006.01)
*E02F 9/20* (2006.01)
(Continued)

(52) U.S. Cl.
CPC .......... *F15B 11/044* (2013.01); *E02F 9/2004* (2013.01); *E02F 9/2203* (2013.01);
(Continued)

(58) Field of Classification Search
CPC ....... F15B 11/042; F15B 11/044; F15B 11/05; F15B 2211/30565; F15B 2211/35; F15B 2211/6309; F15B 2211/6313; E02F 9/2203
See application file for complete search history.

(56) References Cited

U.S. PATENT DOCUMENTS 6,718,759 B1 4/2004 Tabor
6,732,512 B2 * 5/2004 Pfaff ..................... E02F 9/2025
60/459
(Continued)

FOREIGN PATENT DOCUMENTS

DE 102009047035 A1 * 6/2011 ............ F15B 11/042
EP 2811174 A1 12/2014
(Continued)

*Primary Examiner* — Michael Leslie
(74) *Attorney, Agent, or Firm* — Alleman Hall & Tuttle LLP

(57) ABSTRACT

This hydraulic drive system includes: a hydraulic pump capable of changing a discharge flow rate of a working fluid; a meter-in control valve that controls a meter-in flow rate of the working fluid flowing from the hydraulic pump to a hydraulic actuator; a meter-out control valve that is provided separately from the meter-in control valve and controls a meter-out flow rate of the working fluid being drained from the hydraulic actuator into a tank; an operation device that outputs an operation command; a first pressure sensor that detects a drainage pressure of the hydraulic actuator; and a control device that sets a target meter-out flow rate according to the operation command from the operation device and controls an opening degree of the meter-out control valve on the basis of the drainage pressure detected by the first pressure sensor and the target meter-out flow rate.

11 Claims, 3 Drawing Sheets

(51) Int. Cl.

| | |
|---|---|
| ***E02F 9/22*** | (2006.01) |
| ***F15B 11/042*** | (2006.01) |
| ***F15B 11/05*** | (2006.01) |
| ***F15B 21/08*** | (2006.01) |

(52) U.S. Cl.

CPC .......... *E02F 9/2235* (2013.01); *E02F 9/2271* (2013.01); *E02F 9/2296* (2013.01); *F15B 11/042* (2013.01); *F15B 11/05* (2013.01); *F15B 21/087* (2013.01); *F15B 2211/20546* (2013.01); *F15B 2211/30565* (2013.01); *F15B 2211/327* (2013.01); *F15B 2211/351* (2013.01); *F15B 2211/353* (2013.01); *F15B 2211/6309* (2013.01); *F15B 2211/6313* (2013.01)

(56) References Cited

U.S. PATENT DOCUMENTS

| | | | | |
|---|---|---|---|---|
| 7,066,446 | B2 * | 6/2006 | Nielsen | F15B 13/0433 251/324 |
| 8,375,989 | B2 * | 2/2013 | Schottler | F15B 11/044 91/367 |
| 11,193,254 | B2 * | 12/2021 | Moriki | E02F 9/2267 |
| 11,230,821 | B2 * | 1/2022 | Kanazawa | E02F 9/2012 |
| 2007/0130933 | A1 | 6/2007 | Yoshino | |
| 2009/0203480 | A1 * | 8/2009 | Petzold | F16H 61/2807 475/127 |
| 2016/0069360 | A1 | 3/2016 | Callesen et al. | |
| 2023/0323901 | A1 * | 10/2023 | Nose | E02F 9/2292 60/325 |

FOREIGN PATENT DOCUMENTS

| | | | | | |
|---|---|---|---|---|---|
| JP | H01108401 | A | | 4/1989 | |
| JP | H11303814 | A | | 11/1999 | |
| JP | 2007162944 | A | | 6/2007 | |
| KR | 20140050004 | A | * | 7/2011 | F15B 11/042 |

* cited by examiner

HYDRAULIC DRIVE SYSTEM

TECHNICAL FIELD

The present invention relates to a hydraulic drive system that supplies a working fluid to a hydraulic actuator.

BACKGROUND ART

There is a hydraulic drive system capable of independently controlling a meter-in flow rate and a meter-out flow rate of a hydraulic actuator. Known examples of this hydraulic drive system include the hydraulic pressure supply device disclosed in Japanese Laid-Open Patent Application Publication (PTL) 1.

CITATION LIST

Patent Literature

PTL 1: Japanese Laid-Open Patent Application Publication No. H11-303814

SUMMARY OF INVENTION

Technical Problem

In the hydraulic pressure supply device disclosed in PTL 1, a meter-in flow rate is controlled to control movement of a hydraulic actuator. However, there are demands for improved operability of the hydraulic actuator rather than controlling the movement of the hydraulic actuator using the meter-in flow rate.

Thus, an object of the present invention is to provide a hydraulic drive system capable of improving the operability of a hydraulic actuator.

Solution to Problem

A hydraulic drive system according to the present invention includes: a hydraulic pump capable of changing a discharge flow rate of a working fluid; a meter-in control valve that controls a meter-in flow rate of the working fluid flowing from the hydraulic pump to a hydraulic actuator; a meter-out control valve that is provided separately from the meter-in control valve and controls a meter-out flow rate of the working fluid being drained from the hydraulic actuator into a tank; an operation device that outputs an operation command; a first pressure sensor that detects a drainage pressure of the hydraulic actuator; and a control device that sets a target meter-out flow rate according to the operation command from the operation device and controls an opening degree of the meter-out control valve on the basis of the drainage pressure detected by the first pressure sensor and the target meter-out flow rate.

According to the present invention, by controlling the meter-out flow rate, it is possible to accelerate and decelerate, especially, decelerate, the hydraulic actuator at a speed corresponding to the operation command. With this, the operability of the hydraulic actuator can be improved.

Advantageous Effects of Invention

With the present invention, the operability of a hydraulic actuator can be improved.

The above object, other objects, features, and advantages of the present invention will be made clear by the following detailed explanation of preferred embodiments with reference to the attached drawings.

DESCRIPTION OF EMBODIMENTS

Figure 1:
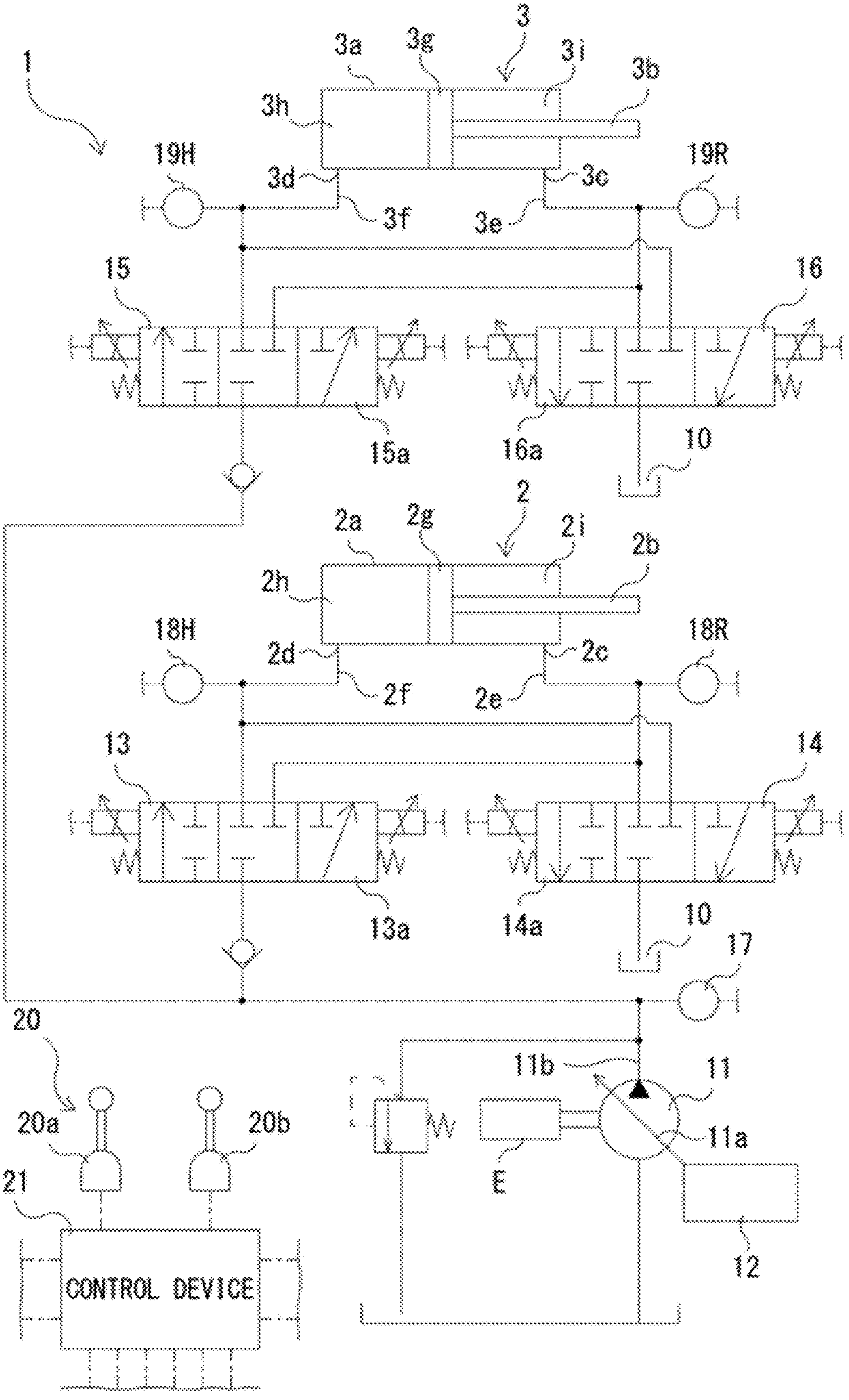
FIG. 1 is a hydraulic circuit diagram showing a hydraulic system according to an embodiment of the present invention.

Hereinafter, a hydraulic drive system 1 according to an embodiment of the present invention will be described with reference to the aforementioned drawings. Note that the concept of directions mentioned in the following description is used for the sake of explanation; the orientations, etc., of elements according to the invention are not limited to these directions. The hydraulic drive system 1 described below is merely one embodiment of the present invention. Thus, the present invention is not limited to the embodiment and may be subject to addition, deletion, and alteration within the scope of the essence of the invention.

<Hydraulically Driven Equipment>

Hydraulically driven equipment such as construction equipment, industrial equipment, and industrial vehicles includes a plurality of hydraulic actuators 2, 3 and the hydraulic drive system 1. The hydraulically driven equipment is capable of moving various elements by actuating the hydraulic actuators 2, 3. In the present embodiment, the hydraulically driven equipment is a hydraulic excavator, for example. The hydraulically driven equipment includes at least two hydraulic actuators 2, 3. The two hydraulic actuators 2, 3, which are hydraulic cylinders, are a boom cylinder and a bucket cylinder. Note that the hydraulically driven equipment may include three or more hydraulic actuators. Furthermore, the hydraulic actuator is not limited to the boom cylinder and the bucket cylinder and may be an arm cylinder or may even be a hydraulic motor such as a turning motor.

Each of the hydraulic cylinders 2, 3 can expand and contract to move various elements. More specifically, in the hydraulic cylinders 2, 3, rods **2*b*, 3*b* are inserted into cylinder tubes 2*a*, 3*a*, respectively, so as to be able to move back and forth. Furthermore, rod-end ports 2*c*, 3*c* and head-end ports 2*d*, 3*d* are formed on the cylinder tubes 2*a*, 3*a*. When a working fluid is supplied to and drained from the ports 2*c*, 2*d*, 3*c*, 3*d*, the rods 2*b*, 3*b* move back and forth with respect to the cylinder tubes 2*a*, 3*a*, respectively, in other words, the hydraulic cylinders 2, 3** expand and contact, respectively.

More specifically, the rods **2*b*, 3*b* include pressure-receiving parts 2*g*, 3*g*. The inside of the cylinder tubes 2*a*, 3*a* is partitioned by the pressure-receiving parts 2*g*, 3*g* into rod-end chambers 2*i*, 3*i* and head-end chambers 2*h*, 3*h*. The rod-end chambers 2*i*, 3*i* are connected to the rod-end ports 2*c*, 3*c*, and the head-end chambers 2*h*, 3*h* are connected to the head-end ports 2*d*, 3*d*. When the working fluid flows into the rod-end chambers 2*i*, 3*i*, the pressure-receiving parts 2*g*, 3*g* push the head-end chambers 2*h*, 3*h* via the head-end ports 2*d*, 3*d*. On the other hand, when the working fluid flows into the head-end chambers 2***h*, 3*h*, the pressure-receiving parts 2*g*, 3*g* push the rod-end chambers 2*i*, 3*i* via the rod-end ports 2*c*, 3*c*.

<Hydraulic Drive System>

The hydraulic drive system 1 actuates the hydraulic actuators 2, 3 by supplying the working fluid to the hydraulic actuators 2, 3 or draining the working fluid from the hydraulic actuators 2, 3. More specifically, the hydraulic cylinders 2, 3 are connected to the hydraulic drive system 1 in parallel. In other words, the ports 2*c*, 2*d*, 3*c*, 3*d* of the hydraulic actuators 2, 3 are individually connected to the hydraulic drive system 1. The hydraulic drive system 1 can supply the working fluid to the ports 2*c*, 2*d*, 3*c*, 3*d* of the hydraulic actuators 2, 3 and drain the working fluid from the ports 2*c*, 2*d*, 3*c*, 3*d* of the hydraulic actuators 2, 3. Thus, it is possible to actuate the hydraulic actuators 2, 3. The hydraulic drive system 1 having such a function includes a hydraulic pump 11, a variable capacity device 12, a plurality of meter-in control valves 13, 15, a plurality of meter-out control valves 14, 16, a plurality of pressure sensors 17, 18R, 18H, 19R, 19H, an operation device 20, and a control device 21.

The hydraulic pump 11 is connected to a drive source. The drive source is an engine E or an electric motor. Note that in the present embodiment, the drive source is the engine E. The hydraulic pump 11 is rotationally driven by the drive source to discharge the working fluid. The hydraulic pump 11 is a variable-capacity hydraulic pump. Specifically, the hydraulic pump 11 can change a discharge flow rate by changing a discharge capacity. In the present embodiment, the hydraulic pump 11 is a variable-capacity swash plate pump. Specifically, the hydraulic pump 11 can change the discharge flow rate by changing the tilt angle of a swash plate 11*a*. Note that the hydraulic pump 11 may be a variable-capacity swash plate pump.

The variable capacity device 12 changes the discharge capacity of the hydraulic pump 11 according to an input pump command. More specifically, the variable capacity device 12 is provided on the swash plate 11*a* of the hydraulic pump 11. The variable capacity device 12 changes the discharge capacity of the hydraulic pump 11 by changing the tilt angle of the swash plate 11*a*.

The first meter-in control valve 13, which is one of the plurality of meter-in control valves, is connected to the hydraulic pump 11 and the first hydraulic cylinder 2. The first meter-in control valve 13 controls the meter-in flow rate of the working fluid that flows from the hydraulic pump 11 to the first hydraulic cylinder 2. More specifically, the first meter-in control valve 13 is connected to the hydraulic pump 11 via a pump passage 11*b*. Furthermore, the first meter-in control valve 13 is connected to the rod-end port 2*c* of the first hydraulic cylinder 2 via a rod-end passage 2*e* and is connected to the head-end port 2*d* of the first hydraulic cylinder 2 via a head-end passage 2*f*. Moreover, the first meter-in control valve 13 can control, according to an input first meter-in command, the direction and the meter-in flow rate of the working fluid that is supplied from the hydraulic pump 11 to the first hydraulic cylinder 2. Specifically, the first meter-in control valve 13 can supply the working fluid from the hydraulic pump 11 to one of the ports 2*c*, 2*d* of the first hydraulic cylinder 2 and control the meter-in flow rate. In the present embodiment, the first meter-in control valve 13 is an electronically controlled spool valve. Specifically, the first meter-in control valve 13 has a spool 13*a* moving on the basis of the first meter-in command, thereby switching the flow direction of the working fluid and controlling the opening degree of the first meter-in control valve 13.

The first meter-out control valve 14, which is one of the plurality of meter-out control valves, is connected to the first hydraulic cylinder 2 and a tank 10. The first meter-out control valve 14 controls the meter-out flow rate of the working fluid that is drained from the first hydraulic cylinder 2 into the tank 10. More specifically, the first meter-out control valve 14 is provided so as to correspond to the first meter-in control valve 13. The first meter-out control valve 14 is connected to each of the rod-end passage 2*e* and the head-end passage 2*f* so as to be in parallel with the corresponding first meter-in control valve 13. The first meter-out control valve 14 can control, according to an input first meter-out command, the direction and the meter-out flow rate of the working fluid that is drained from the first hydraulic cylinder 2 into the tank 10. Specifically, the first meter-out control valve 14 connects, to the tank 10, the ports 2*d*, 2*c* that are different from the ports 2*c*, 2*d* to which the first meter-in control valve 13 is connected, and controls the meter-out flow rate. Note that the first meter-out control valve 14 can control the meter-out flow rate of the working fluid flowing through the first meter-out control valve 14 independently from the meter-in flow rate of the working fluid flowing to the first hydraulic cylinder 2 via the first meter-in control valve 13. In the present embodiment, the first meter-out control valve 14 is an electronically controlled spool valve. Specifically, the first meter-out control valve 14 has a spool 14*a* moving on the basis of the first meter-out command. By moving the spool 14*a*, the first meter-out control valve 14 switches the flow direction of the working fluid and controls the opening degree of the first meter-out control valve 14.

The second meter-in control valve 15, which is one of the plurality of meter-in control valves, is connected to the hydraulic pump 11 so as to be in parallel with the first meter-in control valve 13, and is connected to the second hydraulic cylinder 3. The second meter-in control valve 15 controls the meter-in flow rate of the working fluid that flows from the hydraulic pump 11 to the second hydraulic cylinder 3. More specifically, the second meter-in control valve 15 is connected to the pump passage 11*b* so as to be in parallel with the first meter-in control valve 13. The second meter-in control valve 15 is connected to the rod-end port 3*c* of the second hydraulic cylinder 3 via a rod-end passage 3*c* and is connected to the head-end port 3*d* of the second hydraulic cylinder 3 via a head-end passage 3*f*. Moreover, the second meter-in control valve 15 can control, according to an input second meter-in command, the direction and the meter-in flow rate of the working fluid that is supplied from the hydraulic pump 11 to the second hydraulic cylinder 3. In the present embodiment, the second meter-in control valve 15 is an electronically controlled spool valve. Specifically, the second meter-in control valve 15 has a spool 15*a* moving on the basis of the second meter-in command, thereby switching the flow direction of the working fluid and controlling the opening degree of the second meter-in control valve 15.

The second meter-out control valve 16, which is one of the plurality of meter-out control valves, is connected to the second hydraulic cylinder 3 and the tank 10. The second meter-out control valve 16 controls the meter-out flow rate of the working fluid that is drained from the second hydraulic cylinder 3 into the tank 10. More specifically, the second meter-out control valve 16 is provided so as to correspond to the second meter-in control valve 15. The second meter-out control valve 16 is connected to each of the rod-end passage 3*e* and the head-end passage 3*f* so as to be in parallel with the corresponding second meter-in control valve 15. The second meter-out control valve 16 can control, according to an input second meter-out command, the direction and the meter-out flow rate of the working fluid that is drained from the second hydraulic cylinder 3 into the tank 10. Note that the second meter-out control valve 16 can also control the meter-out flow rate of the working fluid flowing through the second meter-out control valve 16 independently from the meter-in flow rate of the working fluid flowing to the second hydraulic cylinder 3 via the second meter-in control valve 15. In the present embodiment, the second meter-out control valve 16 is an electronically controlled spool valve. Specifically, the second meter-out control valve 16 has a spool 16*a* moving on the basis of the second meter-out command, thereby switching the flow direction of the working fluid and controlling the opening degree of the second meter-out control valve 16.

Each of the plurality of pressure sensors 17, 18R, 18H, 19R, 19H detects the pressure of the working fluid flowing through a certain point. Subsequently, each of the plurality of pressure sensors 17, 18R, 18H, 19R, 19H outputs the detected pressure to the control device 21. More specifically, the discharge pressure sensor 17 is connected to the pump passage 11*b*. The discharge pressure sensor 17 detects the discharge pressure of the hydraulic pump 11. The rod-end pressure sensors 18R, 19R are connected to the rod-end passages 2*e*, 3*e*, respectively. The rod-end pressure sensors 18R, 19R detect the pressure (rod pressure) of the rod-end port 2*c* of the first hydraulic cylinder 2 and the pressure (rod pressure) of the rod-end port 3*c* of the second hydraulic cylinder 3, respectively. The head-end pressure sensors 18H, 19H are connected to the head-end passages 2*f*, 3*f*, respectively. The head-end pressure sensors 18H, 19H detect the pressure (head pressure) of the head-end port 2*d* of the first hydraulic cylinder 2 and the pressure (head pressure) of the head-end port 3*d* of the second hydraulic cylinder 3, respectively. Note that the plurality of first pressure sensors and the plurality of second pressure sensors correspond to the plurality of pressure sensors 17, 18R, 18H, 19R, 19H in the present embodiment.

The operation device 20 outputs operation commands for actuating the hydraulic actuators 2, 3 to the control device 21. In the present embodiment, the control device 20 is an operation valve or an electric joystick, for example. The operation device 20 includes a plurality of operation levers (in the present embodiment, two operation levers) 20*a*, 20*b*. The operation levers 20*a*, 20*b*, which are one example of the plurality of operation tools, are configured in such a manner that an operator can operate the operation levers 20*a*, 20*b*. The operation device 20 outputs operation commands corresponding to the amount of operation of the operation levers 20*a*, 20*b* to the control device 21. In the present embodiment, each of the two operation levers 20*a*, 20*b* can pivot in a predetermined operation direction. The operation device 20 outputs operation commands corresponding to the operation (in the present embodiment, the direction and amount of operation) of the operation levers 20*a*, 20*b* to the control device 21. More specifically, when the first operation lever 20*a* is operated, the operation device 20 outputs a first operation command corresponding to the amount of operation. When the second operation lever 20*b* is operated, the operation device 20 outputs a second operation command corresponding to the amount of operation. The first operation command is an operation command for actuating the first hydraulic cylinder 2. The second operation command is an operation command for actuating the second hydraulic cylinder 3. The operation lever may be configured so as to be able to pivot in all directions in plan view that include two intersecting directions (for example, the depth direction and the width direction). In this case, the operation device 20 resolves the amount of operation in the direction of operation of the operation lever into a depth component and a width component and outputs the first and second operation commands corresponding to the respective components.

Figure 2:
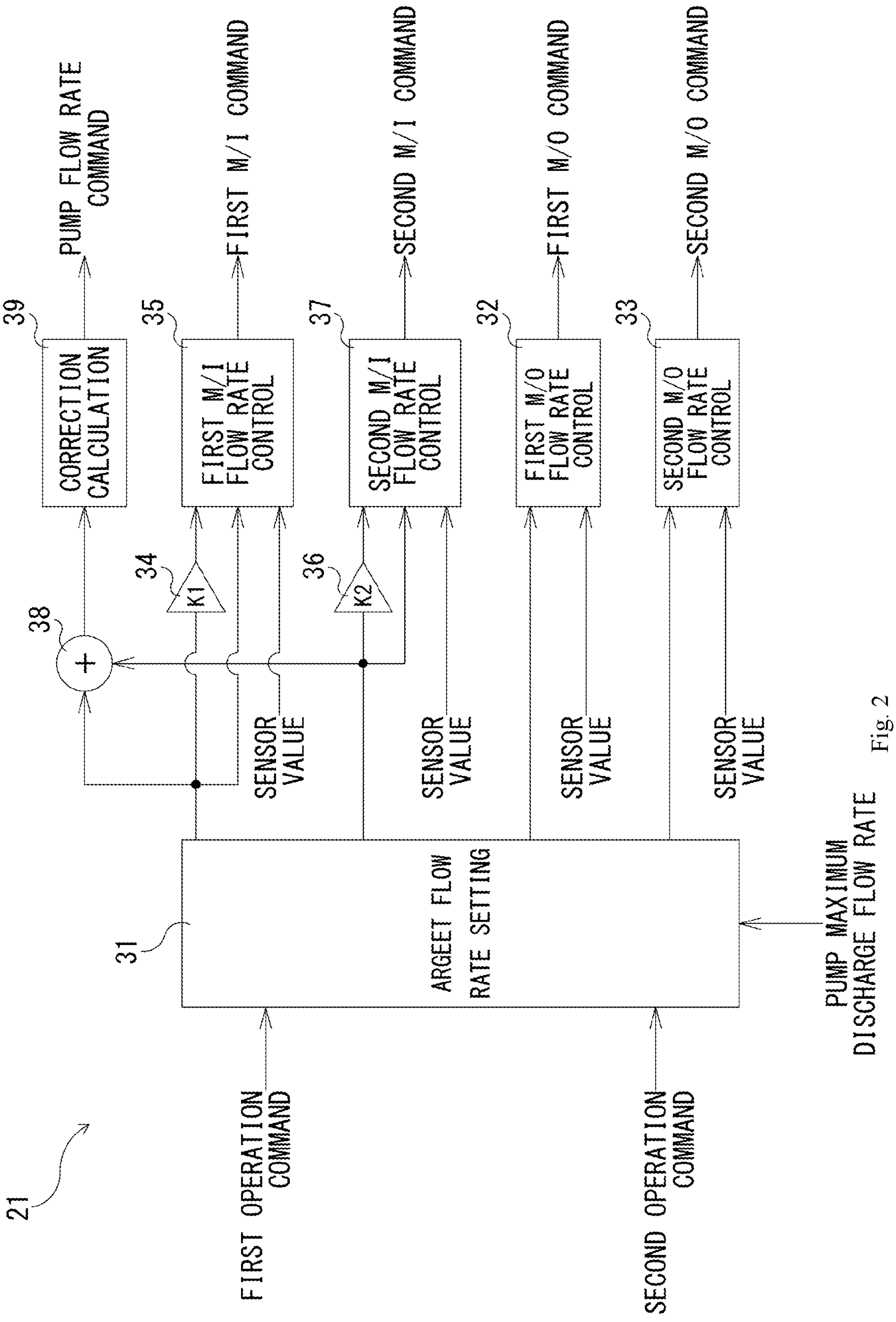
FIG. 2 is a block diagram of a control device included in the hydraulic system shown in FIG. 1 that is related to opening control for control valves.

The control device 21 is connected to the four control valves 13 to 16, the pressure sensors 17, 18R, 18H, 19R, 19H, and the operation device 20. The control device 21 controls the opening degrees of the control valves 13 to 16 according to the operation commands from the operation device 20 and the pressure detected by the pressure sensors 17, 18R, 18H, 19R, 19H. More specifically, the control device 21 sets a target meter-out flow rate (hereinafter referred to as a "target M/O flow rate") according to the operation commands from the operation device 20. The control device 21 controls the opening degrees of the meter-out control valves 14, 16 on the basis of the target M/O flow rates and the drainage pressure of the hydraulic actuators 2, 3 detected by any of the pressure sensors 17, 18R, 18H, 19R, 19H. Thus, the control device 21 actuates the hydraulic actuators 2, 3 at speeds corresponding to the operation commands, in other words, speeds corresponding to the amounts of operation of the operation levers 20*a*, 20*b*. Furthermore, the control device 21 sets a target meter-in flow rate (hereinafter referred to as a "target M/I flow rate") corresponding to the target M/O flow rate. Subsequently, the control device 21 controls the discharge flow rate of the hydraulic pump 11 and the opening degrees of the meter-in control valves 13, 15 so that the working fluid is supplied to the hydraulic actuators 2, 3 at the target M/I flow rates. The control device 21 having such a function is configured as follows. Specifically, the control device 21 includes a target flow rate setting unit 31, a first meter-out flow rate controller (hereinafter referred to as a "first M/O flow rate controller") 32, a second meter-out flow rate controller (hereinafter referred to as a "second M/O flow rate controller") 33, a first corrector 34, a first meter-in flow rate controller (hereinafter referred to as a "first M/I flow rate controller") 35, a second corrector 36, a second meter-in flow rate controller (hereinafter referred to as a "second M/I flow rate controller") 37, a total flow rate calculator 38, and a correction calculator 39, as shown in FIG. 2.

The target flow rate setting unit 31 sets target M/O flow rates and target M/I flow rates for the hydraulic cylinders 2, 3 on the basis of the operation commands from the operation levers 20*a*, 20*b*. The target M/O flow rates are target flow rates at which the working fluid is to be drained from the hydraulic cylinders 2, 3 in order to actuate the hydraulic cylinders 2, 3 at target speeds corresponding to the amounts of operation. The target M/I flow rates are flow rates at which the working fluid is to flow into the hydraulic cylinders 2, 3 so that there is no excess or deficit relative to the target speeds and which is to be set according to the target M/O flow rates. When a total flow rate that is the total of the meter-in flow rates at which the working fluid is supplied to the two hydraulic cylinders 2, 3 is greater than or equal to a predetermined flow rate, the target flow rate setting unit 31 adjusts the target M/I flow rates so that the total flow rate falls below the predetermined flow rate. The total flow rate is a flow rate resulting from correction by a correction calculator 39, which will be described later in detail. Note that the total flow rate may be a flow rate obtained by simply combining the meter-in flow rates. Furthermore, the target flow rate setting unit 31 adjusts the target M/O flow rate on the basis of the adjusted target M/I flow rate. In the present embodiment, the predetermined flow rate is the maximum discharge flow rate of the hydraulic pump 11. Note that when the working fluid is generated and regenerated in the hydraulic cylinders 2, 3, a flow rate obtained by adding generation flow rates and regeneration flow rates to the maximum discharge flow rate of the hydraulic pump 11 is set to the predetermined flow rate. Furthermore, when the hydraulic drive system includes an accumulator, flow rates at which the working fluid is supplied from the accumulator to the hydraulic cylinders 2, 3 are further added to the predetermined flow rate.

Figure 3:
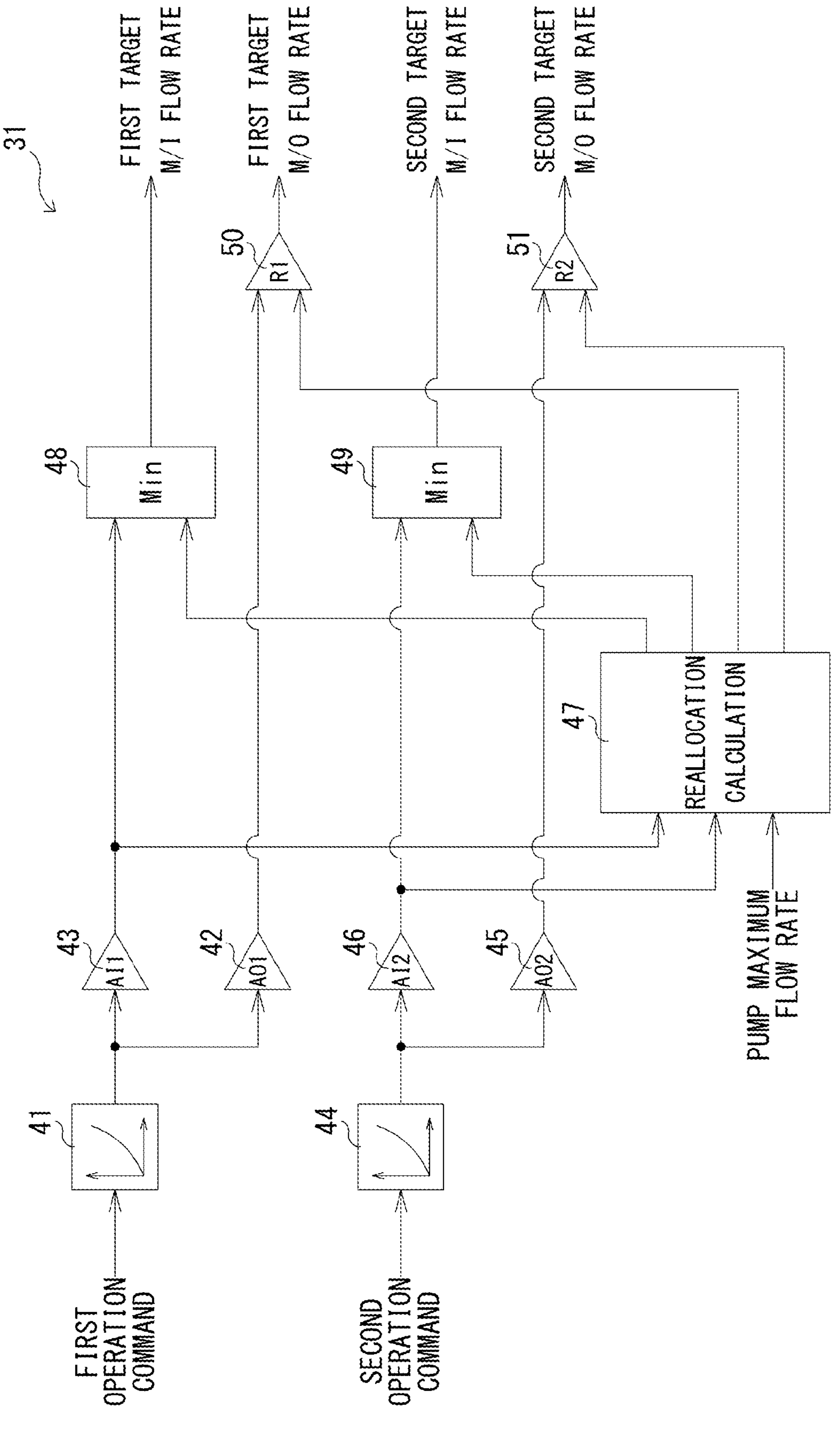
FIG. 3 is a block diagram of a target flow rate setting unit shown in FIG. 2 that is related to flow rate settings.

More specifically, the target flow rate setting unit 31 includes a first speed calculator 41, a first meter-out flow rate calculator (hereinafter referred to as a "first M/O flow rate calculator") 42, a first meter-in flow rate calculator (hereinafter referred to as a "first M/I flow rate calculator") 43, a second speed calculator 44, a second meter-out flow rate calculator (hereinafter referred to as a "second M/O flow rate calculator") 45, a second meter-in flow rate calculator (hereinafter referred to as a "second M/I flow rate calculator") 46, a reallocation calculator 47, a first selector 48, a second selector 49, a first flow rate adjuster 50, and a second flow rate adjuster 51, as shown in FIG. 3.

The first speed calculator 41 calculates, on the basis of the first operation command, a first target speed that is a target speed of the first hydraulic cylinder 2. More specifically, the first speed calculator 41 calculates the first target speed corresponding to the amount of operation of the first operation lever 20*a*. In the present embodiment, the first speed calculator 41 includes a first map. In the first map, the amounts of operation of the first operation lever 20*a* and the first target speeds are associated. The first speed calculator 41 calculates the first target speed on the basis of the first map and the amount of operation of the first operation lever 20*a*.

The first M/O flow rate calculator 42 calculates a first M/O flow rate on the basis of the first target speed calculated by the first speed calculator 41 and a meter-out pressure-receiving area AO1 of the pressure-receiving part 2*g* of the first hydraulic cylinder 2. More specifically, the first M/O flow rate calculator 42 obtains the direction of movement of the rod 2*b* of the first hydraulic cylinder 2 on the basis of the first operation command. Subsequently, the first M/O flow rate calculator 42 sets the meter-out pressure-receiving area AO1 of the pressure-receiving part 2*g* according to the direction of movement of the rod 2*b*. For example, when the first operation lever 20*a* is operated in one direction of the first operation and the rod 2*b* is extended, the working fluid in the rod-end chamber 2*i* is drained. Therefore, the area of a portion of the pressure-receiving part 2*g* that faces the rod-end chamber 2*i* is set as the meter-out pressure-receiving area AO1. On the other hand, when the first operation lever 20*a* is operated in the other direction of the first operation and the rod 2*b* is retracted, the area of a portion of the pressure-receiving part 2*g* that faces the head-end chamber 2*h* is set as the meter-out pressure-receiving area AO1. After the setting, the first M/O flow rate calculator 42 calculates the first M/O flow rate by multiplying the set meter-out pressure-receiving area AO1 by the first target speed.

The first M/I flow rate calculator 43 calculates a first M/I flow rate on the basis of the first target speed calculated by the first speed calculator 41 and a meter-in pressure-receiving area All of the pressure-receiving part 2*g* of the first hydraulic cylinder 2. More specifically, the first M/I flow rate calculator 43 obtains the direction of movement of the rod 2*b* of the first hydraulic cylinder 2 on the basis of the first operation command as with the case of the first M/O flow rate. Subsequently, the first M/I flow rate calculator 43 sets the meter-in pressure-receiving area All of the pressure-receiving part 2*g* according to the direction of movement of the rod 2*b*. For example, when the first operation lever 20*a* is operated in one direction of the first operation and the rod 2*b* is extended, the working fluid is supplied to the head-end chamber 2*h*. Therefore, the area of the portion of the pressure-receiving part 2*g* that faces the head-end chamber 2*h* is set as the meter-in pressure-receiving area All. On the other hand, when the first operation lever 20*a* is operated in the other direction of the first operation and the rod 2*b* is retracted, the area of the portion of the pressure-receiving part 2*g* that faces the rod-end chamber 2*i* is set as the meter-in pressure-receiving area All. After the setting, the first M/I flow rate calculator 43 calculates the first M/I flow rate by multiplying the set meter-in pressure-receiving area All by the first target speed.

The second speed calculator 44 calculates, on the basis of the second operation command, a second target speed that is a target speed of the second hydraulic cylinder 3. More specifically, the second speed calculator 44 calculates the first target speed corresponding to the amount of operation of the second operation lever 20*b*. In the present embodiment, the second speed calculator 44 includes a second map. In the second map, the amount of operation of the second operation lever 20*b* and the second target speed are associated. The second speed calculator 44 calculates the second target speed on the basis of the second map and the amount of operation of the second operation lever 20*b*.

The second M/O flow rate calculator 45 calculates a second M/O flow rate on the basis of the second target speed calculated by the second speed calculator 44 and a meter-out pressure-receiving area AO2 of the pressure-receiving part 3*g* of the second hydraulic cylinder 3. More specifically, the second M/O flow rate calculator 45 calculates the second M/O flow rate in substantially the same method as the first M/O flow rate calculator 42. Specifically, the second M/0 flow rate calculator 45 obtains the direction of movement of the rod 3*b* of the second hydraulic cylinder 3 on the basis of the second operation command. Subsequently, the second M/O flow rate calculator 45 sets the meter-out pressure-receiving area AO2 of the pressure-receiving part 3*g* according to the direction of movement of the rod 3*b*. Specifically, similar to the meter-out pressure-receiving area AO1 of the pressure-receiving part 2*g* of the hydraulic cylinder 2, the meter-out pressure-receiving area AO2 of the pressure-receiving part 3*g* is set to either the area of a portion of the pressure-receiving part 3*g* that faces the rod-end chamber 3*i* or the area of a portion of the pressure-receiving part 3*g* that faces the head-end chamber 3*h* according to a direction of the second operation of the second operation lever 20*b*. Furthermore, the second M/O flow rate calculator 45 calculates the second M/O flow rate by multiplying the set meter-out pressure-receiving area AO2 by the second target speed.

The second M/I flow rate calculator 46 calculates a second M/I flow rate on the basis of the second target speed calculated by the second speed calculator 44 and a meter-in pressure-receiving area AI2 of the pressure-receiving part 3*g* of the second hydraulic cylinder 3. More specifically, the second M/I flow rate calculator 46 calculates the second M/I flow rate in substantially the same method as the method for calculating the first-target M/I flow rate. Specifically, the second M/I flow rate calculator 46 obtains the direction of movement of the rod 3*b* of the second hydraulic cylinder 3 on the basis of the second operation command. Subsequently, the second M/I flow rate calculator 46 sets the meter-in pressure-receiving area AI2 of the pressure-receiving part 3g according to the direction of movement of the rod 3b. Specifically, similar to the meter-in pressure-receiving area All of the pressure-receiving part 2g of the hydraulic cylinder 2, the meter-out pressure-receiving area AO2 of the pressure-receiving part 3g is set to either the area of the portion of the pressure-receiving part 3g that faces the head-end chamber 3h or the area of the portion of the pressure-receiving part 3g that faces the rod-end chamber 3i according to a direction of the second operation of the second operation lever 20b. Furthermore, the second M/I flow rate calculator 46 calculates the second M/I flow rate by multiplying the set meter-in pressure-receiving area AI2 by the second target speed.

The reallocation calculator 47 calculates a reallocation percentage in order to adjust the first and second M/I flow rates according to a total flow rate that is the total of the first and second M/I flow rates. More specifically, the reallocation calculator 47 calculates the reallocation percentage in order to adjust the first and second M/I flow rates so that the total flow rate falls below the predetermined flow rate mentioned above. Note that the total flow rate calculator 38, which will be described later in detail, calculates the total flow rate. More specifically, the reallocation calculator 47 divides a predetermined flow rate by the total flow rate that is the total of the first and second M/I flow rates and thereby calculates the ratio of the predetermined flow rate to the total flow rate. When the ratio of the predetermined flow rate is greater than or equal to 1, the total flow rate is less than or equal to the predetermined flow rate. Therefore, 1 is set to the reallocation percentage because there is no need to adjust the first and second M/I flow rates. On the other hand, when the ratio of the predetermined flow rate is less than 1, the total flow rate exceeds the predetermined flow rate. In this case, the reallocation calculator 47 sets the aforementioned ratio of the predetermined flow rate to the reallocation percentage in order to make the total flow rate less than or equal to the predetermined flow rate.

The first selector 48 selects the first M/I flow rate calculated by the first M/I flow rate calculator 43 or the first M/I flow rate reallocated by the reallocation calculator 47, whichever is smaller. For example, when the total flow rate is greater than or equal to the predetermined flow rate, the reallocation percentage is less than 1, meaning that the first M/I flow rate reallocated is less than the first M/I flow rate that has not been allocated. Therefore, when the total flow rate is greater than or equal to the predetermined flow rate, the first selector 48 selects, as the first M/I flow rate, the first M/I flow rate reallocated. On the other hand, when the total flow rate is less than the predetermined flow rate, the reallocation percentage is 1, meaning that the first M/I flow rate calculated by the first M/I flow rate calculator 43 and the first M/I flow rate reallocated by the reallocation calculator 47 are the same. Therefore, the first selector 48 selects the first M/I flow rate calculated by the first M/I flow rate calculator 43. Subsequently, the first M/I flow rate selected is set to a first target M/I flow rate of the target flow rate setting unit 31.

Similar to the first selector 48, the second selector 49 selects the second M/I flow rate calculated by the second M/I flow rate calculator 46 or the second M/I flow rate reallocated by the reallocation calculator 47, whichever is smaller. On the other hand, when the total flow rate is less than the predetermined flow rate, the reallocation percentage is 1, meaning that the second M/I flow rate calculated by the second M/I flow rate calculator 46 and the second M/I flow rate reallocated by the reallocation calculator 47 are the same. Therefore, the second selector 49 selects the second M/I flow rate calculated by the second M/I flow rate calculator 46. Subsequently, the second M/I flow rate selected is set to a second target M/I flow rate of the target flow rate setting unit 31.

The first flow rate adjuster 50 adjusts a first target M/O flow rate according to the first M/I flow rate that has been adjusted. More specifically, the first flow rate adjuster 50 adjusts the first M/O flow rate according to the reallocation percentage calculated by the reallocation calculator 47. In the present embodiment, the first flow rate adjuster 50 multiplies the first M/O flow rate calculated by the first M/O flow rate calculator 42 by the reallocation percentage of the first M/I flow rate. Subsequently, the first M/O flow rate resulting from the multiplication is set to the first target M/O flow rate of the target flow rate setting unit 31.

Similar to the first flow rate adjuster 50, the second flow rate adjuster 51 adjusts a second target M/O flow rate according to the second M/I flow rate that has been adjusted. More specifically, the second flow rate adjuster 51 adjusts the second M/O flow rate according to the reallocation percentage calculated by the reallocation calculator 47. In the present embodiment, the second flow rate adjuster 51 multiplies the second M/O flow rate calculated by the second M/O flow rate calculator 45 by the reallocation percentage of the second M/I flow rate. Subsequently, the second M/O flow rate resulting from the multiplication is set to the second target M/O flow rate of the target flow rate setting unit 31.

The first M/O flow rate controller 32 controls the opening degree of the first meter-out control valve 14 on the basis of the first target M/O flow rate set by the target flow rate setting unit 31 and the pressure detected by the pressure sensors 18R, 18H. More specifically, the first M/O flow rate controller 32 first calculates an upstream-downstream pressure of the first meter-out control valve 14. The upstream-downstream pressure of the first meter-out control valve 14 is a difference between the drainage pressure of the first hydraulic cylinder 2 detected by the rod-end pressure sensor 18R or the head-end pressure sensor 18H (first pressure sensor) and the pressure of piping that connects the first meter-out control valve 14 and the tank 10 (approximately equal to a tank pressure). The present embodiment assumes that the pressure of the piping is the tank pressure. Furthermore, the first M/O flow rate controller 32 calculates the opening degree of the first meter-out control valve 14 on the basis of the first target M/O flow rate, the upstream-downstream pressure of the first meter-out control valve 14, and a mathematical expression (for example, Bernoulli's principle). Subsequently, the first M/O flow rate controller 32 outputs, to the first meter-out control valve 14, the first meter-out command (hereinafter referred to as a "first M/O command") corresponding to the calculated opening degree. With this, the opening degree of the first meter-out control valve 14 is controlled so as to correspond to the first target M/O flow rate. Subsequently, the working fluid can be drained from the first hydraulic cylinder 2 into the tank 10 via the first meter-out control valve 14 at the first target M/O flow rate. This allows the first hydraulic cylinder 2 to be actuated at a speed corresponding to the amount of operation of the first operation lever 20a.

Similar to the first M/O flow rate controller 32, the second M/O flow rate controller 33 controls the opening degree of the second meter-out control valve 16 on the basis of the second target M/O flow rate set by the target flow rate setting unit 31 and the pressure detected by the pressure sensors 19R, 19H. More specifically, the second M/O flow rate controller 33 first calculates an upstream-downstream pressure of the second meter-out control valve 16. The upstream-downstream pressure of the second meter-out control valve 16 is a difference between the drainage pressure of the second hydraulic cylinder 3 detected by the rod-end pressure sensor 19R or the head-end pressure sensor 19H (first pressure sensor) and the pressure of piping that connects the second meter-out control valve 16 and the tank 10 (approximately equal to the tank pressure). The present embodiment assumes that the pressure of the piping is the tank pressure. Furthermore, the second M/O flow rate controller 33 calculates the opening degree of the second meter-out control valve 16 on the basis of the second target M/O flow rate, the upstream-downstream pressure of the second meter-out control valve 16, and a mathematical expression (for example, Bernoulli's principle). Subsequently, the second M/O flow rate controller 33 outputs, to the second meter-out control valve 16, the second meter-out command (hereinafter referred to as a "second M/O command") corresponding to the calculated opening degree. With this, the opening degree of the second meter-out control valve 16 is controlled so as to correspond to the second target M/O flow rate. Subsequently, the working fluid can be drained from the second hydraulic cylinder 3 into the tank 10 via the second meter-out control valve 16 at the second target M/O flow rate. This allows the second hydraulic cylinder 3 to be actuated at a speed corresponding to the amount of operation of the second operation lever 20*b*.

The first corrector 34 calculates a first corrected M/I flow rate (corrected flow rate) by correcting the first target M/I flow rate set by the target flow rate setting unit 31. More specifically, in the first corrector 34, a predetermined coefficient K1 (>1) is set in advance. The first corrector 34 multiplies the first target M/I flow rate by the coefficient K1. Thus, the first corrected M/I flow rate, which is the first target M/I flow rate corrected, is calculated.

The first M/I flow rate controller 35 controls the opening degree of the first meter-in control valve 13 on the basis of the first corrected M/I flow rate, which is the first target M/I flow rate corrected by the first corrector 34, and the pressure sensors 17, 18R, 18H. More specifically, the first M/I flow rate controller 35 first calculates an upstream-downstream pressure of the first meter-in control valve 13. The upstream-downstream pressure of the first meter-in control valve 13 is a difference between an inflow pressure of the first hydraulic cylinder 2 detected by the head-end pressure sensor 18H or the rod-end pressure sensor 18R (second pressure sensor) and a discharge pressure detected by the discharge pressure sensor 17 (third pressure sensor). Furthermore, the first M/I flow rate controller 35 calculates a target opening degree of the first meter-in control valve 13 on the basis of the first corrected M/I flow rate, the upstream-downstream pressure of the first meter-in control valve 13, and a mathematical expression (for example, Bernoulli's principle).

Furthermore, the first M/I flow rate controller 35 sets a first upper limit opening degree of the first meter-in control valve 13 so that the discharge pressure detected by the discharge pressure sensor 17 is greater than a maximum pressure (maximum load pressure) that is the maximum of the inflow pressure (load pressure) of the hydraulic cylinders 2, 3 by a predetermined pressure a. Specifically, the first M/I flow rate controller 35 calculates the first upper limit opening degree so that the discharge pressure detected by the discharge pressure sensor 17 is greater than the highest inflow pressure detected by the pressure sensors 18H, 18R, 19H, 19R (hereinafter referred to as "the maximum pressure of the hydraulic cylinders 2, 3") by the predetermined pressure a. To explain it in more detail, the first M/I flow rate controller 35 calculates the first upper limit opening degree on the basis of the first target M/I flow rate, the maximum pressure of the hydraulic cylinders 2, 3, the predetermined pressure a, and a mathematical expression (for example, Bernoulli's principle). In other words, the first M/I flow rate controller 35 defines the maximum pressure of the hydraulic cylinders 2, 3 as a downstream pressure of the first meter-in control valve 13 and defines, as an upstream pressure (discharge pressure) of the first meter-in control valve 13, a pressure obtained by adding the predetermined pressure a to the maximum pressure of the hydraulic cylinders 2, 3. The first M/I flow rate controller 35 sets an upstream-downstream pressure for the first meter-in control valve 13 on the basis of the downstream pressure and the upstream pressure of the first meter-in control valve 13. Furthermore, the first M/I flow rate controller 35 calculates the first upper limit opening degree on the basis of the upstream-downstream pressure that is set for the first meter-in control valve 13, the first target M/I flow rate, and a mathematical expression (for example, Bernoulli's principle).

When the target opening degree of the first meter-in control valve 13 is less than the first upper limit opening degree, the first M/I flow rate controller 35 sets the target opening degree to the opening degree of the first meter-in control valve 13. On the other hand, when the target opening degree of the first meter-in control valve 13 is greater than or equal to the first upper limit opening degree, the first M/I flow rate controller 35 sets the first upper limit opening degree to the opening degree of the first meter-in control valve 13. Subsequently, the first M/I flow rate controller 35 outputs the first meter-in command (hereinafter referred to as a "first M/I command") corresponding to the set opening degree to the first meter-in control valve 13. This allows the first M/I flow rate controller 35 to control the opening degree of the first meter-in control valve 13 while implementing pressure compensation for the hydraulic cylinders 2, 3. Note that when only the first operation lever 20*a* is operated, the first M/I flow rate controller 35 sets the maximum opening degree to the opening degree of the first meter-in control valve 13.

The second corrector 36 corrects the second target M/I flow rate (corrected flow rate) set by the target flow rate setting unit 31. More specifically, in the second corrector 36, a predetermined coefficient K2 (>1) is set in advance. Note that in the present embodiment, the predetermined coefficient K2 is the same as the predetermined coefficient K1. The second corrector 36 multiplies the second target M/I flow rate by the coefficient K2. Thus, the second corrected M/I flow rate, which is the second target M/I flow rate corrected, is calculated.

Similar to the first M/I flow rate controller 35, the second M/I flow rate controller 37 controls the opening degree of the second meter-in control valve 15 on the basis of the second corrected M/I flow rate, which is the second target M/I flow rate corrected by the second corrector 36, and the pressure sensors 17, 19R, 19H. More specifically, the second M/I flow rate controller 37 first calculates an upstream-downstream pressure of the second meter-in control valve 15. The upstream-downstream pressure of the second meter-in control valve 15 is a difference between a discharge pressure detected by the discharge pressure sensor 17 and an inflow pressure of the second hydraulic cylinder 3 detected by the rod-end pressure sensor 19R or the head-end pressure sensor 19H (second pressure sensor). Furthermore, the second M/I flow rate controller 37 calculates a target opening degree of the second meter-in control valve 15 on the basis of the second corrected M/I flow rate, the upstream-downstream pressure of the second meter-in control valve 15, and a mathematical expression (for example, Bernoulli's principle).

Note that in the present embodiment, a second upper limit opening degree of the second meter-in control valve 15 is set so that the discharge pressure detected by the discharge pressure sensor 17 is greater than the maximum pressure (maximum load pressure) that is the maximum of the inflow pressure (load pressure) of the hydraulic cylinders 2, 3 by a predetermined pressure a; specifically, similar to the first M/I flow rate controller 35, the second M/I flow rate controller 37 calculates the second upper limit opening degree so that the discharge pressure detected by the discharge pressure sensor 17 is greater than the maximum pressure of the hydraulic cylinders 2, 3 by the predetermined pressure a. To explain it in more detail, the second M/I flow rate controller 37 calculates the second upper limit opening degree on the basis of the second target M/I flow rate, the maximum pressure of the hydraulic cylinders 2, 3, the predetermined pressure a, and a mathematical expression (for example, Bernoulli's principle). In other words, the maximum pressure of the hydraulic cylinders 2, 3 is defined as a downstream pressure of the second meter-in control valve 15, and a pressure obtained by adding the predetermined pressure a to the maximum pressure of the hydraulic cylinders 2, 3 is defined as an upstream pressure (discharge pressure) of the second meter-in control valve 15. The second M/I flow rate controller 37 sets an upstream-downstream pressure for the second meter-in control valve 15 on the basis of the downstream pressure and the upstream pressure of the second meter-in control valve 15. Furthermore, the second M/I flow rate controller 37 calculates the second upper limit opening degree on the basis of the upstream-downstream pressure that is set for the second meter-in control valve 15, the second target M/I flow rate, and a mathematical expression (for example, Bernoulli's principle).

When the target opening degree of the second meter-in control valve 15 is less than the second upper limit opening degree, the second M/I flow rate controller 37 sets the target opening degree to the opening degree of the second meter-in control valve 15. On the other hand, when the target opening degree of the second meter-in control valve 15 is greater than or equal to the second upper limit opening degree, the second M/I flow rate controller 37 sets the second upper limit opening degree to the opening degree of the second meter-in control valve 15. Subsequently, the second M/I flow rate controller 37 outputs the second meter-in command (hereinafter referred to as a "second M/I command") corresponding to the set opening degree to the second meter-in control valve 15. This allows the second M/I flow rate controller 37 to control the opening degree of the second meter-in control valve 15 while implementing pressure compensation for the hydraulic cylinders 2, 3. Note that when only the operation lever 20_b_ is operated, the second M/I flow rate controller 37 sets the maximum opening degree to the opening degree of the second meter-in control valve 15.

The total flow rate calculator 38 calculates a total flow rate. More specifically, the total flow rate calculator 38 calculates a total flow rate that is the total of target M/I flow rates that are set by the target flow rate setting unit 31, that is, the total of the first target M/I flow rate and the second target M/I flow rate.

The correction calculator 39 corrects the total flow rate calculated by the total flow rate calculator 38. Subsequently, the correction calculator 39 sets the discharge flow rate of the hydraulic pump 11 on the basis of the corrected total flow rate. More specifically, the correction calculator 39 corrects the total flow rate so as to add a bleed flow rate (not indicated in the drawings) and a leakage flow rate. When the total flow rate is less than the maximum discharge flow rate of the hydraulic pump 11, the correction calculator 39 sets the total flow rate to the discharge flow rate of the hydraulic pump 11. On the other hand, when the total flow rate is greater than or equal to the maximum discharge flow rate of the hydraulic pump 11, the maximum discharge flow rate is set to the discharge flow rate of the hydraulic pump 11. The correction calculator 39 outputs a pump command to the variable capacity device 12 on the basis of the set discharge flow rate. With this, the variable capacity device 12 positions the swash plate 11_a_ at a tilt angle corresponding to the pump command. Subsequently, the working fluid is discharged from the hydraulic pump 11 at the set discharge flow rate.

<Operation of Hydraulic Drive System (Solo Operation)>

In the hydraulic drive system 1, when only one of the operation levers 20_a_, 20_b_ is operated, the operation device 20 outputs, to the control device 21, an operation command corresponding to the direction and amount of operation of the operation lever 20_a_ or 20_b_ operated. For example, when only the first operation lever 20_a_ is operated, the operation device 20 outputs the first operation command to the control device 21. This causes the target flow rate setting unit 31 of the control device 21 to set the first target M/O flow rate and the first target M/I flow rate on the basis of the first operation command. More specifically, in the target flow rate setting unit 31, the first speed calculator 41 calculates the first target speed on the basis of the first operation command. Subsequently, the first M/O flow rate calculator 42 calculates the first M/O flow rate on the basis of the first target speed. Furthermore, the first M/I flow rate calculator 43 sets the first M/I flow rate on the basis of the first target speed. The reallocation calculator 47 sets the reallocation percentage. For example, when the first M/I flow rate is greater than the maximum discharge flow rate due to load on the first hydraulic cylinder 2, the reallocation calculator 47 sets a value obtained by dividing the predetermined flow rate by the first target M/I flow rate to the reallocation percentage. Subsequently, the reallocation calculator 47 sets the first M/O flow rate multiplied by the reallocation percentage to the first target M/O flow rate of the target flow rate setting unit 31. On the other hand, when the total flow rate is less than the maximum discharge flow rate, the value obtained by dividing the predetermined flow rate by the first target M/I flow rate exceeds 1. Therefore, the reallocation calculator 47 sets 1 to the reallocation percentage. The reallocation calculator 47 then sets the first M/I flow rate set by the first M/I flow rate calculator 43 to the first target M/I flow rate of the target flow rate setting unit 31.

The first M/O flow rate controller 32 controls the opening degree of the first meter-out control valve 14 on the basis of the first target M/O flow rate set by the target flow rate setting unit 31 and the pressure detected by the pressure sensors 18R, 18H. Thus, the working fluid is drained from the hydraulic cylinder 2 at the first target M/O flow rate corresponding to the amount of operation of the operation lever 20_a_. Accordingly, the hydraulic cylinder 2 can be actuated at a speed corresponding to the amount of operation of the operation lever 20_a_. Meanwhile, the first M/I flow rate controller 35 controls the opening degree of the first meter-in control valve 13 so that said opening degree reaches the maximum opening degree. Note that the opening degree of the first meter-in control valve 13 is not limited to the maximum opening degree; it is sufficient that the opening degree be a predetermined opening degree equivalent to the maximum opening degree. Furthermore, the total flow rate calculator 38 calculates a total flow rate (equal to the first target M/I flow rate). The correction calculator 39 then corrects the total flow rate calculated by the total flow rate calculator 38. Subsequently, the correction calculator 39 sets the discharge flow rate of the hydraulic pump 11 on the basis of the corrected total flow rate. Furthermore, the correction calculator 39 outputs a pump command to the variable capacity device 12 on the basis of the set discharge flow rate. The working fluid is then discharged from the hydraulic pump 11 at the set discharge flow rate. Thus, it is possible to supply the working fluid to the hydraulic cylinder 2 at the flow rate corresponding to the target M/O flow rate.

Note that although not described in detail, substantially the same method is applied in the case where the second operation lever 20*b* is operated; the control device 21 sets the second flow M/O flow rate and the second M/I flow rate. Subsequently, the control device 21 controls the operation of the hydraulic pump 11, the second meter-in control valve 15, and the second meter-out control valve 16 on the basis of the second M/O flow rate and the second M/I flow rate that have been set.

In the hydraulic drive system 1 configured as described above, the meter-out flow rate is controlled according to the operation command. Thus, it is possible to accelerate and decelerate, especially, decelerate, each of the hydraulic cylinders 2, 3 at a speed corresponding to the operation command. This makes it possible to improve the operability of each of the hydraulic cylinders 2, 3. Furthermore, by controlling the meter-out flow rate, it is possible to stably control the speed of each of the hydraulic cylinders 2, 3 with accuracy. In addition, by controlling the meter-in flow rate according to the meter-out flow rate, it is possible to prevent cavitation, an excessive increase in pressure, etc., that are caused due to an excessive or deficient meter-in flow rate.

Furthermore, in the hydraulic drive system 1, the target M/O flow rate is set on the basis of the target speeds and the meter-out pressure-receiving areas AO1, AO2, meaning that the hydraulic cylinders 2, 3 can be actuated at the target speeds regardless of the values of the meter-out pressure-receiving areas AO1, AO2 of the pressure-receiving parts 2*g*, 3*g* of the hydraulic cylinders 2, 3. This makes it possible to further improve the operability of each of the hydraulic cylinders 2, 3.

Furthermore, in the hydraulic drive system 1, similar to the target M/O flow rate, the target M/I flow rate is also set on the basis of the amount of operation of each of the operation levers 20*a*, 20*b*. Specifically, in the hydraulic drive system 1, the discharge flow rate of the hydraulic pump 11 and the opening degrees of the meter-in control valves 13, 15 are controlled so that the working fluid is supplied to the hydraulic cylinders 2, 3 at the target M/I flow rates corresponding to the target M/O flow rates. Thus, the flow rate corresponding to the target M/O flow rate is set to the target M/I flow rate, making it possible to prevent an excessive increase in the discharge pressure of the hydraulic pump 11 and prevent cavitation, for example. Furthermore, in the hydraulic drive system 1, the speeds of the hydraulic cylinders 2, 3 are adjusted according to the meter-out flow rates, and thus the M/I flow rate controllers 35, 37 can control the meter-in control valves 13, 15 on the basis of the corrected M/I flow rates greater than the target M/I flow rates. Thus, it is possible to reduce the occurrences of pressure loss that is caused due to excessive reduction in the opening degrees of the meter-in control valves 13, 15 relative to fluctuations in the first and second M/O flow rates. In other words, it is possible to reduce pressure loss in the meter-in control valves 13, 15.

<Operation of Hydraulic Drive System (Combined Operation)>

In the hydraulic drive system 1, when the operation levers 20*a*, 20*b* are operated at the same time, the operation device 20 outputs the first and second operation commands corresponding to the directions and amounts of the operation to the control device 21. This causes the target flow rate setting unit 31 to set the first and second target M/O flow rates and the first and second target M/I flow rates on the basis of the operation commands. More specifically, in the target flow rate setting unit 31, the first and second speed calculators 41, 44 calculate the first and second target speeds on the basis of the operation commands in substantially the same method as in the case of the solo operation. Subsequently, the first M/O flow rate calculator 42 sets the first M/O flow rate on the basis of the first target speed, and the first M/I flow rate calculator 43 sets the first M/I flow rate on the basis of the first target speed. Furthermore, the second M/O flow rate calculator 45 sets the second M/O flow rate on the basis of the second target speed, and the second M/I flow rate calculator 46 sets the second M/I flow rate on the basis of the second target speed.

Furthermore, the reallocation calculator 47 sets the reallocation percentage. Specifically, when the total flow rate is less than the maximum discharge flow rate, the reallocation calculator 47 sets 1 to the reallocation percentage. In this case, the first and second M/I flow rates are not adjusted, and therefore the first and second M/I flow rates that have been set by the first and second M/I flow rate calculators 43, 46 are set to the first and second target M/I flow rates of the target flow rate setting unit 31. Accordingly, the first and second M/O flow rates that have been set by the first and second M/O flow rate calculators 42, 45 are set to the first and second target M/O flow rates of the target flow rate setting unit 31.

On the other hand, when the total flow rate is greater than or equal to the maximum discharge flow rate, the reallocation calculator 47 sets a value obtained by dividing the predetermined flow rate by the first target M/I flow rate to the reallocation percentage. Subsequently, each of the first and second M/I flow rates is multiplied by the reallocation percentage. In this case, the first and second selectors 48, 49 select the first and second M/I flow rates divided by the reallocation percentage. Thus, the first and second M/I flow rates divided by the reallocation percentage are set to the first and second target M/I flow rates of the target flow rate setting unit 31. Furthermore, the first and second flow rate adjusters 50, 51 adjust the first and second M/O flow rates according to the calculated reallocation percentage. Accordingly, the first and second M/O flow rates that have been adjusted are set to the first and second target M/O flow rates of the target flow rate setting unit 31.

The first and second M/O flow rate controllers 32,_33 control the opening degrees of the first and second meter-out control valves 14, 16 on the basis of the first and second target M/O flow rates set by the target flow rate setting unit 31 and the pressure detected by the pressure sensors 18R, 18H, 19R, 19H. This allows the working fluid to be drained from the hydraulic cylinders 2, 3 at the first and second target M/O flow rates corresponding to the amounts of operation of the operation levers 20*a*, 20*b*. Thus, the hydraulic cylinders 2, 3 can be actuated at speeds corresponding to the amounts of operation of the operation levers 20*a*, 20*b*.

The first and second correctors 34, 36 correct the first and second target M/I flow rates set by the target flow rate setting unit 31. As a result, the first corrected M/I flow rate is set greater than the first target M/I flow rate, and the second corrected M/I flow rate is set greater than the second target M/I flow rate. Subsequently, the first and second M/I flow rate controllers 35, 37 calculate the target opening degrees of the first and second meter-in control valves 13, 15 on the basis of the first and second corrected M/I flow rates and the pressure detected by the pressure sensors 17, 18R, 18H, 19R, 19H. Thus, the opening degrees of the first and second meter-in control valves 13 and 15 are controlled so as to correspond to the corrected M/I flow rates. Note that when the target opening degrees are greater than or equal to the first upper limit opening degree and the second upper limit opening degree, the opening degrees of the first and second meter-in control valves 13, 15 are limited to the first upper limit opening degree and the second upper limit opening degree. Thus, the pressure compensation is implemented for the hydraulic cylinders 2, 3.

Furthermore, the total flow rate calculator 38 calculates a total flow rate. Subsequently, the correction calculator 39 corrects the total flow rate calculated by the total flow rate calculator 38. Thereafter, the correction calculator 39 sets the discharge flow rate of the hydraulic pump 11 on the basis of the corrected total flow rate. Furthermore, the correction calculator 39 outputs a pump command to the variable capacity device 12 on the basis of the set discharge flow rate. The working fluid is then discharged from the hydraulic pump 11 at the set discharge flow rate. Thus, it is possible to supply the working fluid to the hydraulic cylinders 2, 3 at the flow rates corresponding to the first and second target M/O flow rates.

In this manner, in the hydraulic drive system 1, when the operation levers 20*a*, 20*b* are operated at the same time and the total flow rate is greater than or equal to the predetermined flow rate, the target M/I flow rates are adjusted so that the total flow rate falls below the maximum discharge flow rate. The control device 21 adjusts the target M/O flow rates as well according to the adjusted target M/I flow rates. Therefore, the working fluid can be kept from being unevenly supplied to one of the hydraulic cylinder 2, 3. Thus, it is possible to ensure the operability of the hydraulic cylinders 2, 3 when the plurality of operation levers 20*a*, 20*b* are operated at the same time.

Furthermore, in the hydraulic drive system 1, the control device 21 resets the target M/I flow rates and the target M/O flow rates according to the reallocation percentage that is a ratio of the predetermined flow rate. Therefore, it is possible to reduce impact on the operability of the hydraulic cylinders 2, 3 when actuating the plurality of hydraulic actuators 2, 3 at the same time. Furthermore, in the hydraulic drive system 1, the control device 21 controls the opening degrees of the meter-in control valves 13, 15 on the basis of the upstream-downstream pressure of the meter-in control valves 13, 15 and the target M/I flow rates. Therefore, when actuating the plurality of hydraulic actuators 2, 3 at the same time, it is possible to supply the working fluid to the hydraulic cylinders 2, 3 at the target meter-in flow rates even in the case where the load pressure of the hydraulic cylinder 2 and the load pressure of the hydraulic cylinder 3 are different. Thus, it is possible to minimize deterioration of the operability of the hydraulic cylinders 2, 3 when the plurality of hydraulic actuators 2, 3 are actuated at the same time.

Furthermore, in the hydraulic drive system 1, the control device 21 sets the upper limit opening degrees of the meter-in control valves 13, 15 so that the discharge pressure of the hydraulic pump 11 exceeds the maximum load pressure that is the maximum of the load pressure of the hydraulic cylinders 2, 3. Thus, it is possible to reduce the occurrence of the working fluid failing to be supplied to the hydraulic cylinders 2, 3 at which the load pressure is high when actuating the plurality of hydraulic actuators 2, 3 at the same time.

OTHER EMBODIMENTS

In the hydraulic drive system 1 according to the present embodiment, the meter-in control valve and the meter-out control valve are provided for every hydraulic actuator, but this configuration is not limiting. Specifically, it is sufficient that the meter-in control valve and the meter-out control valve be provided for at least one of the plurality of hydraulic actuators. In this case, for the remaining hydraulic actuator, a directional control valve in which a meter-in flow rate and a meter-out flow rate are controlled on a one-to-one basis may be provided.

Furthermore, in the hydraulic drive system 1 according to the present embodiment, the pressure of the piping connecting the first meter-out control valve 14 and the tank 10 is approximated by the tank pressure, but the pressure of the piping may be detected by a pressure sensor or may be estimated from a target meter-out flow rate.

Furthermore, in the hydraulic drive system 1 according to the present embodiment, the meter-in control valves 13, 15 may be controlled so as to have predetermined opening degrees regardless of the amounts of operation of the operation levers 20*a*, 20*b* when the operation levers 20*a*, 20*b* are operated solo.

Furthermore, in the hydraulic drive system 1 according to the present embodiment, the control valves 13, 15 that control the meter-in flow rates and the control valves 14, 16 that control the meter-out flow rates are provided for the hydraulic actuators 2, 3, but this configuration is not necessarily limiting. For example, rod-end control valves that control the supply and discharge of the working fluid to and from the rod-end ports 2*c*, 3*c* and head-end control valves that control the supply and discharge of the working fluid to and from the head-end ports 2*d*, 3*d* are provided for the hydraulic cylinders 2, 3. When the working fluid is supplied to the rod-end ports 2*c*, 3*c*, the rod-end control valves function as the meter-in control valves, and the head-end control valves function as the meter-out control valves. On the other hand, when the working fluid is supplied to the head-end ports 2*d*, 3*d*, the head-end control valves function as the meter-in control valves, and the rod-end control valves function as the meter-in control valves. The hydraulic drive system configured as just described produces substantially the same advantageous effects as the hydraulic derive system 1.

Furthermore, in the hydraulic drive system 1 according to the present embodiment, the hydraulic cylinders 2, 3 may be actuated on the basis of operation commands that are output from the operation device in order to achieve automatic operation of the hydraulic cylinders 2, 3. Specifically, the operation device determines movement of the hydraulic cylinders 2, 3 on the basis of various sensors, programs, etc. Subsequently, the operation device outputs operation commands corresponding to the determined movement to the control device 21. This enables automatic operation of the hydraulic cylinders 2, 3. Note that the aforementioned operation device may be configured integrally with the control device 21.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

REFERENCE CHARACTERS LIST

1 hydraulic drive system
2 first hydraulic cylinder
2*b* rod
2*g* pressure-receiving part
3 second hydraulic cylinder
3*b* rod
3*g* pressure-receiving part
10 tank
11 hydraulic pump
13 first meter-in control valve
14 first meter-out control valve
second meter-in control valve
16 second meter-out control valve
17 discharge pressure sensor (third pressure sensor)
18H head-end pressure sensor (first pressure sensor or second pressure sensor)
18R rod-end pressure sensor (first pressure sensor or second pressure sensor)
19H head-end pressure sensor (first pressure sensor or second pressure sensor)
19R rod-end pressure sensor (first pressure sensor or second pressure sensor)
20 operation device
21 control device

The invention claimed is:

1. A hydraulic drive system comprising:
a hydraulic pump capable of changing a discharge flow rate of a working fluid;
a meter-in control valve that controls a meter-in flow rate of the working fluid flowing from the hydraulic pump to a hydraulic actuator;
a meter-out control valve that is provided separately from the meter-in control valve and controls a meter-out flow rate of the working fluid being drained from the hydraulic actuator into a tank;
an operation device that outputs an operation command;
a first pressure sensor that detects a drainage pressure of the hydraulic actuator; and
a control device that sets a target meter-out flow rate according to the operation command from the operation device and controls an opening degree of the meter-out control valve on the basis of the drainage pressure detected by the first pressure sensor and the target meter-out flow rate, wherein
the meter-out control valve drains the working fluid forced out of the hydraulic actuator into the tank according to a command from the control device, and
the control device sets the target meter-out flow rate by multiplying a meter-out pressure-receiving area of a pressure-receiving part of the hydraulic actuator by a target speed corresponding to the operation command from the operation device, the pressure-receiving part forcing the working fluid out of the hydraulic actuator.

2. The hydraulic drive system according to claim 1, wherein:
the hydraulic actuator is a hydraulic cylinder including a rod; and
the control device sets the target meter-out flow rate by multiplying the target speed and the meter-out pressure-receiving area of the pressure-receiving part of the rod.

3. The hydraulic drive system according to claim 1, wherein:
the control device controls the discharge flow rate of the hydraulic pump and an opening degree of the meter-in control valve to cause the working fluid to be supplied to the hydraulic actuator at a target meter-in flow rate corresponding to the target meter-out flow rate.

4. The hydraulic drive system according to claim 1, further comprising:
a second pressure sensor that detects an inflow pressure of the hydraulic actuator; and
the control device controls an opening degree of the meter-in control valve on the basis of a corrected flow rate greater than a target meter-in flow rate and an upstream-downstream pressure of the meter-in control valve calculated on the basis of a discharge pressure detected by the first pressure sensor and the inflow pressure detected by the second pressure sensor.

5. The hydraulic drive system according to claim 4, comprising:
a plurality of meter-in control valves including the meter-in control valve; and
a plurality of meter-out control valves including the meter-out control valve, wherein:
the operation device outputs an operation command corresponding to each of a plurality of hydraulic actuators including the hydraulic actuator;
each of the plurality of meter-in control valves controls a meter-in flow rate of the working fluid flowing from the hydraulic pump to a corresponding one of the plurality of hydraulic actuators;
each of the plurality of meter-out control valves controls a meter-out flow rate of the working fluid being drained from a corresponding one of the plurality of hydraulic actuators into the tank; and
when at least one operation command is output and a total flow rate that is a total of meter-in flow rates of the working fluid being supplied to at least one of the plurality of hydraulic actuators corresponding to the at least one operation command that has been output is greater than or equal to a predetermined flow rate, the control device adjusts each target meter-in flow rate to make the total of the meter-in flow rates less than or equal to the predetermined flow rate and adjusts the target meter-out flow rate according to the meter-in flow rate after the adjustment.

6. The hydraulic drive system according to claim 5, wherein:
the control device adjusts the target meter-in flow rate and the target meter-out flow rate according to a percentage of each of the meter-in flow rates relative to the total flow rate.

7. The hydraulic drive system according to claim 5 comprising:
a plurality of second pressure sensors, each of which detects an inflow pressure of a corresponding one of the plurality of hydraulic actuators; and
a third pressure sensor that detects a discharge pressure of the hydraulic pump, wherein:

the control device controls an opening degree of each of the plurality of meter-in control valves on the basis of the target meter-in flow rate and an upstream-downstream pressure of the meter-in control valve calculated on the basis of the inflow pressure detected by a corresponding one of the plurality of second pressure sensors and the discharge pressure detected by the third pressure sensor.

8. The hydraulic drive system according to claim 7, wherein:

the control device sets an upper limit opening degree of each of the plurality of meter-in control valves on the basis of the inflow pressure detected by a corresponding one of the plurality of the second pressure sensors and the discharge pressure detected by the third pressure sensor to make the discharge pressure greater than a maximum load pressure that is a maximum of load pressure of the plurality of hydraulic actuators.

9. The hydraulic drive system according to claim 1, wherein:

the meter-in control valve is connected to two ports of the hydraulic actuator and controls the meter-in flow rate of the working fluid being supplied from the hydraulic pump to one of the two ports of the hydraulic actuator; and the meter-out control valve is connected to the two ports of the hydraulic actuator and controls the meter-out flow rate of the working fluid being drained from the other of the two ports of the hydraulic actuator into the tank.

10. The hydraulic drive system according to claim 1, wherein:

the hydraulic actuator is a hydraulic cylinder including a rod-end port and a head-end port;

the meter-in control valve is a rod-end control valve that controls the meter-in flow rate of the working fluid being supplied from the hydraulic pump to the rod-end port; and the meter-out control valve is a head-end control valve that controls the meter-out flow rate of the working fluid being drained from the head-end port into the tank.

11. The hydraulic drive system according to claim 1, wherein:

the hydraulic actuator is a hydraulic cylinder including a rod-end port and a head-end port;

the meter-in control valve is a head-end control valve that controls the meter-in flow rate of the working fluid being supplied from the hydraulic pump to the head-end port; and the meter-out control valve is a rod-end control valve that controls the meter-out flow rate of the working fluid being drained from the rod-end port into the tank.

* * * * *